Figure 1:
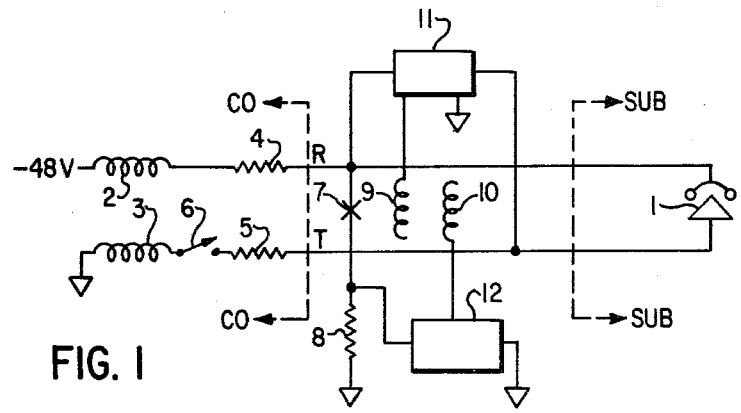

United States Patent [19]

Vaughan

[11] 4,221,936
[45] Sep. 9, 1980

[54] LOOP TO GROUND START CIRCUIT

[75] Inventor: Brian J. N. Vaughan, Ottawa, Canada

[73] Assignee: Mitel Corporation, Kanata, Canada

[21] Appl. No.: 46,974

[22] Filed: Jun. 8, 1979

[30] Foreign Application Priority Data

Mar. 29, 1979 [CA] Canada .................................. 324426

[51] Int. Cl.² ......................... H04M 7/00; H04Q 3/74
[52] U.S. Cl. .............................. 179/18 AD; 179/16 A
[58] Field of Search ........... 179/18 F, 18 FA, 18 AD, 179/16 F, 16 EC, 16 E, 16 EA, 16 AA, 16 A, 17 A, 27 CA

[56] References Cited

U.S. PATENT DOCUMENTS

| | | | |
|---|---|---|---|
| 3,506,789 | 4/1970 | Brockschmidt et al. | 179/18 AD |
| 3,721,768 | 3/1973 | Mazac et al. | 179/18 AD X |
| 3,863,036 | 1/1975 | McCrudden | 179/18 AD X |
| 3,927,272 | 12/1975 | Bloxham et al. | 179/18 AD |

Primary Examiner—Thomas A. Robinson
Attorney, Agent, or Firm—Alan H. Levine

[57] ABSTRACT

A circuit for translating a loop start to a ground start signal in a communication system interconnected via a tip lead and a ring lead, in which the ring lead is connected to a source of potential at a central office or PABX, is comprised of a latching switch connected from a ring lead terminal through a resistance to a ground terminal, a latching switch closing circuit connected to the tip lead for sensing a predetermined potential applied thereto, adapted to close the switch upon its detection of at least a predetermined proportion of the potential applied to the tip lead as a result of the external application of the source of potential from the ring lead to ground, and a latching switch opening circuit adapted to open the switch following connection of the tip lead to ground through external circuity at the central office or PBX.

10 Claims, 2 Drawing Figures

U.S. Patent

Sep. 9, 1980

4,221,936

LOOP TO GROUND START CIRCUIT

This invention relates to the field of telephone signalling systems, and particularly to a circuit for translating a loop start to a ground start signal in a telephone or other type of communication system.

Communication systems such as telephone systems utilize circuitry adapted to signal requests for service, indications of lines being busy, etc. For example, in a central office switching system or PABX, a so-called "ground start" system is typically used, in which the tip lead is grounded by which the transmission path is seized. In a subscriber's loop on the other hand, comprising a tip and ring lead connected to a local subscriber's telephone set, a so-called "loop start" system is typically used. In the latter system the subscriber's loop is closed upon the operation of a hookswitch by the lifting of the telephone handset, in order to effect seizure.

In a PABX, typically the ground start or seizure signal is transmitted via a crosspoint to one of the tip and ring leads. A potential such as −48 volts is usually applied to the ring lead which terminates at the PABX, while the corresponding tip lead is connected to ground via the switched crosspoint.

In a loop start circuit, on the other hand, the start signal is transmitted by the connection of a low impedance such as 200 ohms between the tip and ring leads.

To interface a loop start to a ground start circuit, buffer circuitry is normally required including balanced transformer, etc. This circuitry also requires a local power source, and a result, requires special provisions to accommodate the power source at the central office or PABX equipment such as mounting racks, etc.

The present invention, on the other hand, is a circuit which allows direct connection between a loop start and a ground start circuit; no interposing transformer or buffer circuitry is required. The circuit is high impedance, and bridges the communication line consisting of the tip and ring leads without interfering with normal line impedance. Further, the circuit is powered directly from the line, eliminating the requirement for a separate power source. Accordingly it can be connected to the line at any convenient location and need not be connected to the line at the central office or on the PABX equipment rack. Thus the present invention allows a simpler design of loop start to ground start circuitry, since the prior special electrical and mechanical interface requirements need not be taken into consideration. The PABX or central office equipment racks can also be of a simpler design should it be decided that the present circuit should be connected to the line at physical locations other than at the former locations.

In general, therefore, the present invention of means for translating a loop start to a ground start signal in a communication system interconnected via a tip lead and a ring lead in which the ring lead is connected to a source of potential at a central office or PABX, is comprised of latching switch means connected from a ring lead terminal through a resistance means to a ground terminal, latching switch closing means connected to the tip lead for sensing a predetermined potential level appearing thereon and adapted to close the switch means upon its detection of at least said predetermined potential level, being a proportion of said potential applied to the tip lead as a result of the external application of said source of potential between the ring lead and ground, and latching switch opening means adapted to open the switch means following detection of external connection of the tip lead to ground through external circuitry. The connection of the tip lead to ground is effected in the central office or PABX by closing a crosspoint switch between the tip lead and ground.

Figure 2:
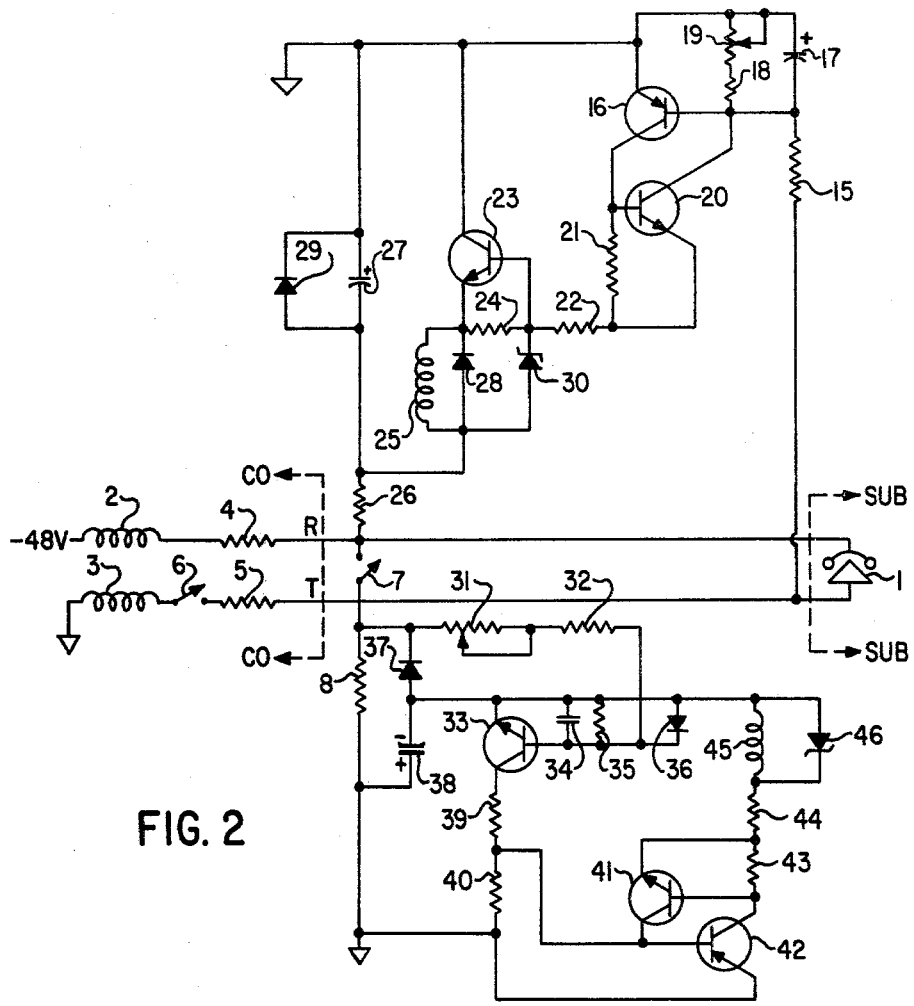

A better understanding of the invention will be obtained by reference to the detailed description below, and to the following drawings, in which:

FIG. 1 is a block schematic of the invention, and
FIG. 2 is a detailed schematic of the invention.

Turning now to FIG. 1, tip and ring leads T and R are shown extending outwardly from a central office or PABX, which is indicated to the left of a dashed line (CO). The tip and ring leads are also connected at the right of a dashed line (SUB) to a telephone set 1. The telephone set is a loop start signal-originating device, while the central office requires a ground start signal.

Within the central office or PBX as shown in FIG. 1 are line and/or central office inductances 2 and 3 and series resistors 4 and 5. A crosspoint switch 6 is also in series with the tip lead at the central office. Resistors 4 and 5 designate the individual standard tip and ring lead resistances from the central office to the point at which the present invention is to be connected, although they may be provided fully or partly as individual resistors within the central office to establish a standard line resistance. Typically resistors 4 and 5 are each about 500 ohms.

The above-described circuitry does not form part of the invention, but is the environment in which the invention normally operates.

The present invention allows the subscriber's loop tip and ring leads which originate a loop start signal to be connected directly to corresponding terminals at the central office or PABX which require a ground start signal (or the provision of a predetermined impedance to ground). No buffer or intervening interface is required other than the circuit of the present invention, which merely bridges the tip and ring leads.

A latching switch means, preferably a reed switch, has its make contact 7 connected to the ring lead, and also through a resistor 8 is connected to ground. Resistor 8 should be about the same resistance as resistor 4 or resistor 5. A latching switch closing means comprising reed relay coil 9, and a latching switch opening means comprising reed relay coil 10 are both located adjacent switch 7 so as to normally operate the switch in a well known manner.

The latching switch closing means is also comprised of a circuit 11 which is connected to the tip and ring leads, to the coil 9 and to ground, and is adapted to operate reed relay coil 9 in order to close (or set) contact 7. A further circuit 12 is connected to the junction between resistor 8 and switch 7, to coil 10 and to ground, and is adapted to operate reed relay coil 10 to open (or reset) switch 7.

In operation, when telephone set 1 goes off-hook, it provides a low impedance DC path between the tip and ring leads (e.g. 200 ohms) and thus initiates the loop start signal. The potential source −48 v. is thus extended from the central office via the ring lead to the tip lead. Circuit 11 senses an increased voltage on the tip lead relative to ground by means of an internal voltage threshold sensing circuit. As a result of the sensing of a voltage at the threshold or higher, it applies current to the closing reed relay coil 9, causing switch 7 to operate.

With switch 7 operated, the ring lead is connected to ground via resistor 8. This provides a ground start signal to the central office, as it requires. The central office responds by closing crosspoint switch 6, which connects the tip lead to ground within the central office.

With the closure of switch 7, the change in potential on the ring lead is sensed relative to ground by circuit 12. As a result it applies current to opening reed relay coil 10, which causes switch 7 to open. The ring lead connection to ground through resistor 8 is thus removed from the ring lead.

It should be noted that the operation or release of reed switch 7 is effected by the application of only pulses to reed relay coils 9 and 10. Thus once the aforenoted threshold potentials have been sensed, and the proper operation or release pulses have been applied to the relay coils, no significant standby coil current is required. The circuits thus do not form a significant current drain to the tip and ring leads, which would affect proper operation of interconnected circuits.

It should also be noted that circuit 12 does not apply current to releasing relay coil 10 to open switch 7 until it has sensed that ground has been applied to the tip lead at the central office or PABX, e.g. by closure of switch 6.

The above circuit thus provides a ground start signal to the central office for as long as is required for the central office to respond, upon reception of a loop start signal from a source such as a local telephone set. This circuit could of course be applied to other types of communication circuirts which require translation of a loop start to a ground start signal.

Turning now to FIG. 2, a detailed circuit of the preferred embodiment of the invention is shown. Telephone subscriber's set 1, and inductances 2 and 3, resistors 4 and 5 and central office switch 6 at the central office are as shown earlier, but do not form part of the present invention. Switch 7 is connected as in FIG. 1, from the ring lead in series with resistor 8 to ground. Resistor 8 is as before of similar value as resistor 4 or 5, the resistance of the ring or tip lead. Typically each resistance is about 500 ohms.

In the switch closing portion of the circuit, resistor 15 is connected to the tip lead and to the base of a PNP transistor 16. Large valued capacitor 17 is connected between the base and emitter of transistor 16, in parallel with the series circuit of resistor 18 and potentiometer 19.

The collector of transistor 16 is connected to the base of PNP transistor 20, which has its own collector connected to the base of transistor 16. Resistor 21 is connected between the base and emitter of transistor 20.

Resistor 22 is connected between the base of NPN transistor 23 and the emitter of transistor 20. The collector of transistor 23 is connected to the emitter of transistor 16 and to ground. Resistor 24 is connected between the base and emitter of transistor 23. A contact closing or "set" coil 25 is connected from the emitter of transistor 23 in series with resistor 26 to the ring lead. The resistance of resistor 26 should be the same as that of resistor 15. A large valued capacitor 27 is connected from the junction of coil 25 and resistor 26 to ground. Diode 28 is connected such as to bypass coil 25, and diode 29 is connected such as to bypass capacitor 27, both in the opposite polarity sense to the polarity of the ring lead relative to ground. Zener diode 30 is connected from the junction of coil 25 and resistor 26 to the base of transistor 23 in the same polarity sense as diode 28.

The switch releasing portion of the circuit is constructed as follows. A series circuit of potentiometer 31 and resistor 32 is connected between the junction of resistor 8 and switch 7 and the base of an NPN transistor 33. Bypass capacitor 34, resistor 35, and diode 36 are all connected in parallel between the base and emitter of transistor 33, with diode 36 being connected in the opposite polarity sense as the base-emitter junction of transistor 33. Diode 37 is connected between the emitter of transistor 33 and the junction of resistor 8 and switch 7. In addition, large valued capacitor 38 is connected between the emitter of transistor 33 and ground.

A voltage divider comprising the series circuit of resistors 39 and 40 is connected between the collector of transistor 33 and ground. The junction of resistors 39 and 40 is connected both to the collector of NPN transistor 41 and the base of PNP transistor 42. The emitter of transistor 42 is connected to ground, and its collector is connected to the base of transistor 41. Resistor 43 is connected between the base and emitter of transistor 41, and the latter emitter is connected through resistor 44 to one terminal of a relay contact releasing or "reset" coil 45. The other terminal of the latter is connected to the emitter of transistor 33. Zener diode 46 is connected between the terminals of coil 45.

Operation of the circuit is as follows. The negative pole of the 48 volt power supply is normally applied to the ring lead at the central office or PBX through coil 2 and ring lead resistance 4. With contact 6 at the central office (or PABX) open, and with the telephone set 1 on-hook, the tip lead is isolated from the 48 volt supply. Resistors 15 and 18 and potentiometer 19 provide a leakage path from the tip lead to ground, ensuring that the tip lead potential is close to ground potential.

In the idle state, contact 7 is open. Capacitor 27, however, has been charged from the ring lead through large valued resistor 26, and thus it retains a substantial charge thereon. This charge will be used for operating current to coil 25.

When a subscriber wishes to request service, he causes the handset at telephone set 1 to go off-hook, closing the subscribers loop, and initiating the loop start signal. This extends the ring lead potential to the tip lead through the approximately 200 ohm internal resistance of the telephone set. Accordingly, capacitor 17 begins charging through resistor 15 from the tip lead to ground. It is preferred that the time constant of this charging circuit should be approximately 100 milliseconds.

Transistors 16 and 20 are connected in a latching circuit, the threshold of operation of which can be set by variation of potentiometer 19. Preferably the threshold of operation of these transistors is about −37 volts, that is, a potential on the tip lead more negative than −37 volts should trigger the operation of the circuit.

Operation of the circuit just-described arises as a result of the application of the threshold potential from the tip lead to the base of transistor 16 and also to capacitor 17. At the instant of application, capacitor 17, which had not been holding charge, begins to charge. Also at the instant of application of potential, the potential between the base and emitter of transistor 16 is very low, hence transistor 16 does not conduct in its emitter-collector circuit. As capacitor 17 begins to charge, eventually the threshold of conduction of transistor 16 is reached by the capacitor potential applied between its emitter and base, and it starts to conduct. Transistor 20 conducts with transistor 16.

With conduction of transistors 16 and 20, transistor 23 conducts and begins to discharge capacitor 27 through coil 25 and through its emitter-collector circuit. Transistor 23 conducts as a result of a base-emitter bias voltage established set up across resistor 24 due to current flow therethrough from the conduction of transistors 16 and 20.

With a sudden rush of current through coil 25, the potential thereacross rises rapidly and could become excessive except for the limiting action provided by zener diode 30, which limits the potential to preferably about 16 volts. With the discharge of capacitor 27 through relay coil 25, the voltage thereacross (and the current) decays exponentially. The voltage across coil 25 has thus increased very rapidly, was limited for a period of time at e.g. 16 volts, and then has decayed exponentially.

With the energization of relay coil 25, contact 7 is caused to close. Since the relay is of latching type, contact 7 remains closed. Ground potential is thus extended through resistor 8 to the ring lead. The central office or PABX, sensing a ground on the ring lead, assumes that it is a normal ground start signal, and responds by closing contact 6, thus extending ground to the tip lead within the central office or PABX.

With the closure of relay contact 7, and the conduction of current through resistor 8, a potential is created thereacross. Charging current is conducted through capacitor 38 and diode 37.

As capacitor 38 charges exponentially, operating potential increases negatively from ground to approximately the ring lead potential and is applied to the emitter of transistor 33.

The base of transistor 33 is connected through potentiometer 31 and resistor 32 to the ring lead via switch 7. In order to start conduction of transistor 33, the potential at the base which results from the potential on the ring lead, must become more positive than the potential reached across capacitor 38. The condition only results if the ring lead potential drops towards ground which occurs when the central office closes the tip lead connection to ground. The connection of the tip lead to ground at the central office decreases the resistance from the ring to ground and hence a larger voltage drop appears across resistors 5 and 4 in the central office or PBX. Hence when the central office closes switch 6, transistor 33 starts to conduct, delayed by the charging of capacitor 34.

Accordingly collector current passes through resistors 39 and 40, causing a voltage drop to occur across resistor 40. This causes operation of transistor 42 which turns on transistor 41, thus providing a conduction path from ground through transistors 41 and 42, resistor 44, relay contact releasing coil 45 and energy source capacitor 38. With the releasing coil 45 energized during a discharge period of capacitor 38, relay contact 7 is released, thus removing the ground from the ring lead which was originally sensed as a ground start signal by the central office or PABX.

With the opening of switch 7, capacitor 38 continues to discharge through transistor 33, until transistor 33 ceases conducting.

With the extension of ground at the central office or PABX through contact 6 to the tip lead, or through switch 7 to the ring lead, the potential on the tip lead becomes approximately half of that applied from the power supply. The resulting potential is rendered less than the threshold potential for operation of transistor 16. Accordingly after discharge of capacitor 17 through resistors 18 and 19 to a potential less than the latter threshold, transistor 16 ceases conduction restoring the circuit to an idle condition. Capacitor 27 has also been discharged by transistor 23, removing potential from transistors 16, 20 and 23 so that the coil 25 is not meanwhile activated.

Potentiometer 31 adjusts the potential level at which the circuit comprising transistor 33 detects the central office closure of switch 6.

To achieve the proper timing, in the preferred embodiment capacitor 38 can be 20 ufd., capacitor 34 can be 0.01 ufd., potentiometer 19 can be approximately 2000 ohms, and potentiometer 31 with resistor 32 can be approximately 100,000 ohms. Resistor 18 can be about 4000 ohms and resistor 32 can be about 10,000 ohms. Capacitor 17 can be about 20 ufd., capacitor 27 can be about 4.7 ufd., and resistors 15 and 26 can each be about 300,000 ohms.

In summary, the resulting current through switch operating coil 25 is rapidly increased after the subscriber set goes off-hook, causing switch 7 to close. After a brief period of time during which the current is limited, current therethrough begins decaying exponentially.

Once switch 6 has closed, the circuit causes current to flow through reset coil 45, to a maximum which is determined by zener diode 46. At a voltage level less than that limited by the zener diode, relay contact 7 is caused to open.

It will be understood that variations or other embodiments may now be fabricated by a person skilled in the art understanding this invention. For instance, the combination of transistors can be silicon controlled rectifiers or an equivalent operation circuit for the switch 7. With an opposite polarity power supply, the transistors can be polarity types opposite to that described. The switch 7 need not be a reed relay contact, since other forms of switches such as semiconductor switches, etc. could be used with appropriate drive circuitry. All such variations and other embodiments of the invention are considered to be within the sphere and scope of the present invention as defined in the claims appended hereto.

What is claimed is:

1. Means for translating a loop start to a ground start signal in a communication system comprising:
    (a) latching switch means including first means for closing said switch means and second means for opening said switch means,
    (b) means for connecting said switch means through a resistance means to ground from a first communication lead which is connected at a first end to a source of potential,
    (c) first circuit means connected to the first communication lead, to a second communication lead and to ground adapted to operate the means for closing said switch means when at least a predetermined proportion of said potential is externally applied to the second communication lead, and
    (d) second circuit means connected across said resistance means and adapted to operate the means for opening the switch means after the switch means is closed,
    the communication leads including means for connecting a loop closing circuit between remote ends thereof for applying said proportion of said potential from the first communication lead to the second communication lead.

2. Means for translating a loop start to a ground start signal in a communication system interconnected via a tip lead and ring lead, in which the ring lead is connected to a source of potential at a central office or PABX, comprising:
   (a) latching switch means connected from a ring lead terminal through a resistor to a ground terminal,
   (b) latching switch closing means connected to the tip lead for sensing a predetermined potential applied thereto, and adapted to close said switch means upon its detection of at least said predetermined potential applied to the tip lead,
   (c) latching switch opening means connected to the ring lead through the switch means adapted to open said switch means upon its detection of the subsequent reduction of said predetermined potential following of closure of said switch means.

3. Means for translating a loop start to a ground start signal in a communication system as defined in claim 2 in which the switch means is comprised of a contact of a latching relay, and said switch closing means and said switch opening means respectively are comprised of operating and releasing coils of the latching relay.

4. Means for translating a loop start to a ground start signal in a communication system as defined in claim 3, in which the switch closing means is comprised of circuit means for detecting a first predetermined potential relative to ground on the tip lead, and for responsively operating the operating coil of the latching relay.

5. Means for translating a loop start to a ground start signal in a communication system as defined in claim 4 in which the switch opening means is comprised of circuit means for detecting a second predetermined potential relative to ground on the ring lead after closure of said contact, and for responsively operating the releasing coil of the latching relay after a predetermined period of time.

6. Means for translating a loop start to a ground start signal in a communication system as defined in claim 4, in which the second predetermined potential is lower than the first predetermined potential.

7. Means for translating a loop start to a ground start signal in a communication system as defined in claim 2, 3 or 5, further including first charge storage means connected between the ring lead and ground adapted to store charge from the source of potential and discharge through and thereby operate the switch closing means for at least a predetermined period, and second charge storage means connected between the latching switch means and ground adapted to charge from the source of potential after the latching switch means is closed and discharge through and thereby operate upon said detection by the latching switch opening means of the reduction of said predetermined potential.

8. Means for translating a loop start to a ground start signal in a communication system as defined in claim 5, further including first charge storage means connected between the ring lead and ground adapted to store charge from the source of potential and discharge through and thereby operate said operating coil, and second charge storage means connected between the latching switch means and ground adapted to charge from the source of potential after the latching switch means is closed and discharge through and thereby operate said releasing coil upon said detection of the reduction of said predetermined potential, means for enabling operation of the latching switch closing means, including means for varying the time prior to said enabling, and means for enabling operation of the switch opening means after closure of the latching switch means and said detection of the reduction of said predetermined potential, including means for varying the time prior to said enabling.

9. Means for translating a loop start to a ground start signal in a communication system as defined in claim 8, in which the first charge storage means is comprised of a capacitor adapted to store charge from the source of potential and discharge through the operating coil of the latching relay to effect energization thereof.

10. Means for translating a loop start to a ground start signal in a communication system as defined in claim 3, 5 or 8, further including a pair of voltage limiting means individually connected across the operating and releasing coils.

* * * * *